United States Patent [19]

Ichizawa et al.

[11] Patent Number: 4,586,891
[45] Date of Patent: May 6, 1986

[54] DEVICE FOR REMOVING AND CONVEYING INJECTION-MOLDED PIECE

[75] Inventors: Yoshiyuki Ichizawa, Sohka; Tsugio Nomoto, Higashi Kurume; Mamoru Oshida, Funabashi, all of Japan

[73] Assignee: Yoshino Kogyosho Co., Ltd., Tokyo, Japan

[21] Appl. No.: 647,542

[22] Filed: Sep. 5, 1984

Related U.S. Application Data

[62] Division of Ser. No. 32,970, Apr. 24, 1979, Pat. No. 4,514,166.

[30] Foreign Application Priority Data

Apr. 24, 1978 [JP] Japan ............................. 53-48573
Apr. 24, 1978 [JP] Japan ............................. 53-48575
Apr. 24, 1978 [JP] Japan ........................... 53-54350[U]

[51] Int. Cl.$^4$ ....................................... B29C 49/64
[52] U.S. Cl. ............................................. 425/526
[58] Field of Search ............... 425/289, 438, 526, 531, 425/533, 537, 554, 556

[56] References Cited

U.S. PATENT DOCUMENTS

| | | | |
|---|---|---|---|
| 3,345,684 | 10/1967 | Scherrer-Wirz | 425/438 |
| 3,408,689 | 11/1968 | Meiner | 425/556 |
| 3,707,591 | 12/1972 | Chalfant | 425/537 |
| 3,947,208 | 3/1976 | Broderick | 425/430 R |
| 4,136,146 | 1/1979 | Ninneman | 425/556 X |
| 4,310,282 | 1/1982 | Spurr et al. | 425/533 X |

FOREIGN PATENT DOCUMENTS 1407157 9/1975 United Kingdom ............... 425/556

*Primary Examiner*—Jay H. Woo
*Assistant Examiner*—Timothy W. Heitbrink
*Attorney, Agent, or Firm*—Parkhurst & Oliff

[57] ABSTRACT

A transparent thin bottle-shaped container is produced by means of a technology for biaxial orientation blow molding a cylindrical piece with a bottom from polyethylene terephthalate material. The pieces are molded in large number in each injection molding process of an injection molding machine. The pieces thus formed immediately after the injection molding are held simultaneously in large number at the gates integrally projected therefrom by a base plate moved forward at the front of the mold in the injection molding machine. They are then conveyed to a gate cutting unit provided near the injection molding machine. The gates are cut from the pieces sequentially by the gate cutting unit and are conveyed onto a conveyor. The pieces are gradually cooled from the hot molded temperature during the conveyance and are additionally cooled while being conveyed on an oblique conveyor installed with a cooler to room temperature or lower predetermined temperature. The cooled pieces are then supplied to a heater immediately before entering a biaxial orientation blow molding process.

4 Claims, 17 Drawing Figures

FIG. 3
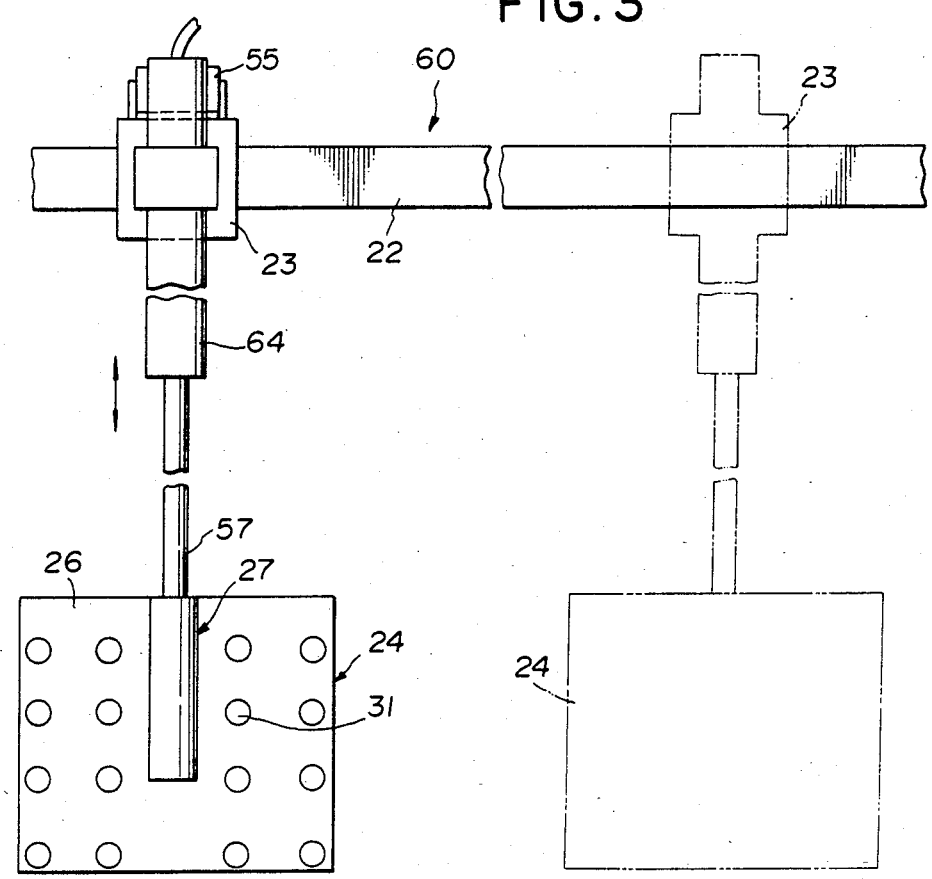
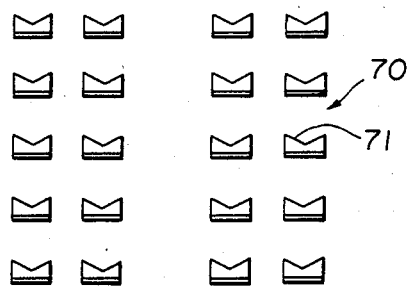
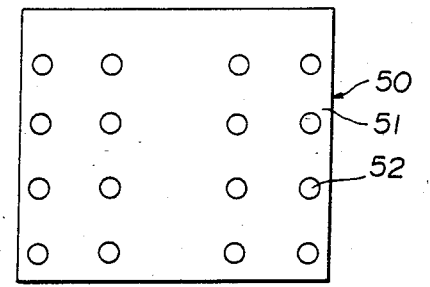

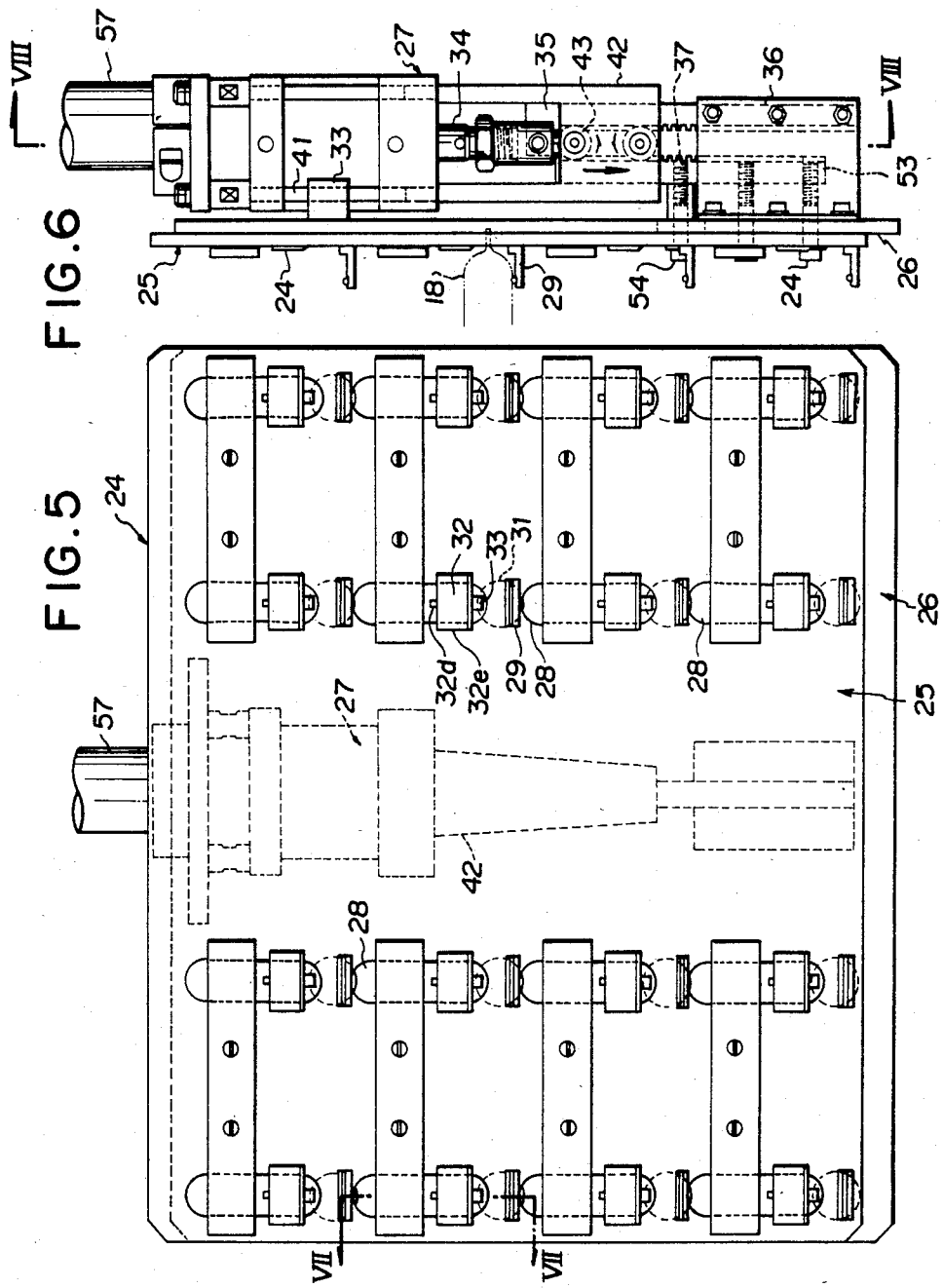

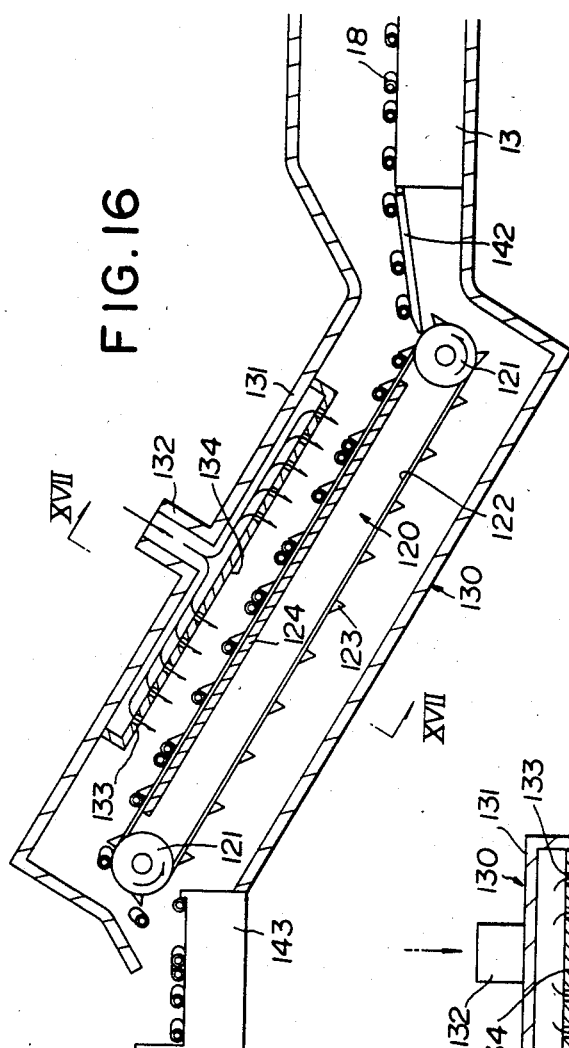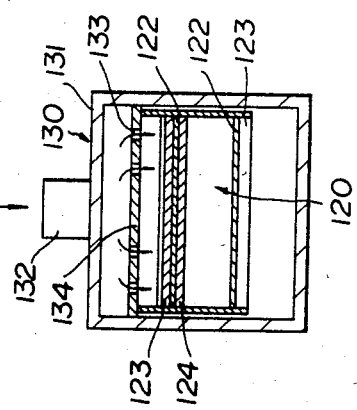

DEVICE FOR REMOVING AND CONVEYING INJECTION-MOLDED PIECE

This is a division of application Ser. No. 032,970 filed Apr. 24, 1979, now U.S. Pat. No. 4,514,166.

BACKGROUND OF THE INVENTION

The present invention relates to a device for removing and conveying an injection-molded piece in an apparatus for fabricating a bottle-shaped blow-molded container of a biaxially oriented plastic. More specifically, it relates to a piece process line which has the steps of drawing a preformed piece from the mold core of an injection molding machine, cutting the gates off of the pieces, and temporarily cooling the pieces before heating them to a temperature adapted for a biaxial orientation process.

Polyethylene terephthalate resin has a wide range of applications in the field of molding material into synthetic resin bottle-shaped containers because of its superior physical properties and characteristics.

In molding a bottle-shaped container of polyethlene terephthalate resin, there is adopted a so-called injection blow molding process in which a preformed piece of cylindrical shape with a bottom is injection-molded, and is then biaxially oriented blow-molded to produce preferable characteristics.

Therefore, such a bottle-shaped container is sequentially molded by a process having the steps of injection molding the piece, removing the piece thus injection-molded, and clamping the piece in a blow molding machine for blow molding the same.

It is desired to automate all of these steps to complete the molding process of such a bottle-shaped container. However, a considerably thick gate is integrally formed at the piece thus injection-molded owing to polyethylene terephthalate characteristics, and this gate of the piece is manually separated with an exclusive cutter.

However, since each run of the injection molding process takes much longer than each run of the blow molding process and since the injection-molded pieces are not so large, a number of such pieces are produced in each molding process. Accordingly, it requires even longer to completely fabricate the bottle-shaped containers since the numerous pieces thus injection-molded must be independently manually separated from their gates, resulting in remarkably inefficient productivity.

SUMMARY OF THE INVENTION

The present invention provides a device for removing and conveying an injection-molded piece (preform) in an apparatus for fabricating a bottle-shaped blow-molded container of a biaxially oriented plastic. The device comprises a piece removing unit for holding the gates of numerous cylindrical pieces with bottoms molded by sequential injection molding steps in an injection molding machine and moving them away from the machine, a gate cutting unit for separating the gates of the pieces thus removed, and a cooler for cooling the pieces to room temperature or less than room temperature as predetermined.

An object of the present invention is to provide an device for removing and conveying an injection-molded preform for a bottle-shaped blow-molded container of polyethylene terephthalate immediately after the molding process from an injection molding machine and to a biaxial orientation blow molding machine, which can simutaneously remove the pieces with bottoms from the molds of the injection molding machine without scratches.

Another object of the present invention is to provide a device for removing and conveying an injection-molded preform for a bottle-shaped blow-molded container of polyethylene terephthalate immediately after the molding process from an injection molding machine and to a biaxial orientation blow molding machine which can hold numerous pieces thus injection-molded via a base plate without altering their array and can rapidly convey them to a gate cutting unit.

Still another object of the present invention is to provide a device for removing and conveying an injection-molded preform for a bottle-shaped blow-molded container of polyethylene terephthalate immediately after the molding process from an injection molding machine and to a biaxial orientation blow molding machine which can cool the pieces thus injection-molded to a predetermined temperature during the piece conveying time in order to make uniform the heating conditions of the pieces immediately before the biaxial orientation blow molding process.

BRIEF DESCRIPTION OF THE DRAWINGS

These and other objects and features of the present invention will become apparent from the following description of the preferred embodiments of the present invention when reading with reference to the accompanying drawings, in which:

FIG. 3 is a partial front view of the device for removing the pieces from the injection molding machine according to the present invention;

FIG. 5 is an expanded front view of the base plate of the injection-molded piece removing unit in the device of the present invention;

FIG. 6 is a side view of the base plate shown in FIG. 5;

FIG. 16 is a longitudinal side sectional view of a preferred embodiment of the cooler of the present invention used for the device of the present invention; and FIG. 17 is a sectional view of the cooler taken along the line XVII—XVII in FIG. 16.

DETAILED DESCRIPTION OF THE PREFERRED EMBODIMENTS

Figure 1:
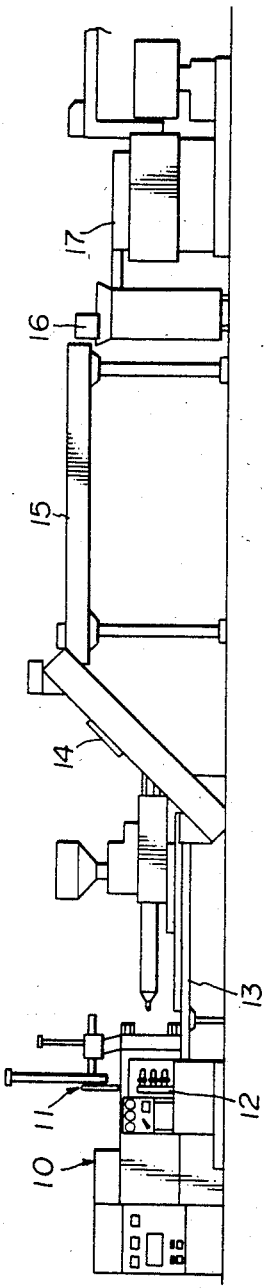
FIG. 1 is a side view of a preferred embodiment of the device in an orientation blow molding process line including removal of pieces preformed in an injection molding machine according to the present invention.

Referring now to the drawings, particularly to FIG. 1 showing a side view of the biaxial orientation blow molding process line employing the principle of the present invention, wherein like reference numerals designate the same parts in the following views, an injection molding machine 10 has an injection-molded piece removing unit 11, and a gate cutting unit 12 provided near the piece removing unit 11. A belt conveyor 13 and a cooler 14 follow the gate cutting unit 12. Next to the cooler 14 are sequentially disposed a conveyor 15, an aligning unit 16, and an orientation blow molding machine 17 including a heater (not shown).

The injection molding machine 10 molds numerous cylindrical pieces 18 each with a bottom.

Figure 2:
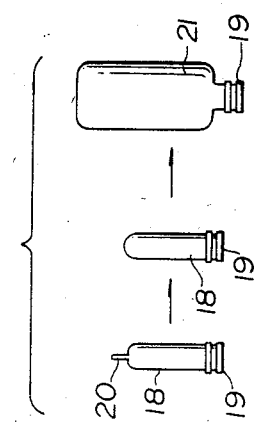
FIG. 2 is a view showing the molding sequence of the pieces in the process line according to the present invention.

As shown in FIG. 2, each of the pieces 18 has a prefinished neck portion 19 at the opening side thereof, and a gate 20 projected integrally from the center of the bottom thereof. The gate of the piece 18 is cut from the piece 18 by the gate cutting unit 12. The piece 18 is then fed through the sequential units described above, then to a jig, heated by the heater (not shown) while being supported by the jig, then oriented longitudinally in the orientation blow molding machine 17, further oriented laterally in the molding machine 17, and thus molded finally to a bottle-shaped container 21 of a biaxial orientation blow-molded plastic as exemplified by the preferred embodiment according to the present invention shown at the rightmost part in FIG. 2.

Each of the respective units in the piece molding process line constructed according to the present invention will be described in detal.

Piece Removing Unit

FIGS. 3 through 8 show the detailed configuration of a preferred embodiment of the piece removing unit 11 according to the present invention. The piece removing unit 11 has a rail 22 fixedly installed perpendicularly over a mold 50 in the injection molding machine 10, moving means 23 laterally movable to the left or right along the rail 22, and a base plate 24 elevationally movably hung from moving means 23 integrally with a holding mechanism (not shown).

The base plate 24 is constructed to make a flat front plate 25 contact a flat rear plate 26 in a relatively slidable manner upon telescopic movement of a hydraulic cylinder 27 with a piston rod 57. By this construction, the base plate can hold or release the piece 18 to be molded into a bottle-shaped container of polyethylene terephthalate resin at the gate 20 projected from the center of the bottom of the piece 18 by means of the relative sliding movement between the front and rear plates. See FIG. 6.

The front plate 25 is disposed to face a male mold 51 (FIG. 3) opened at the front surface in the injection molding machine 11 and is constructed to have a number of longitudinally elongated holes 28 perforated and arranged in the same manner and number as those of a number of cores 52 projected from the mold 51 (FIG. 5). Each of the holes 28 has a predetermined length of the extent capable of receiving the gate 20 of the piece 18 at the bottom thereof. A number of bearers or support 29 members are protruded from the front surface of the front plate 25 directly under the respective holes 28 to carry the respective pieces 18 when the gates 20 enter the respective holes 28. Thus, each of the bearers 29 is projected at the position lower, by substantially a radius of the piece 18, than the bottom of each of the holes 28.

Figure 7:
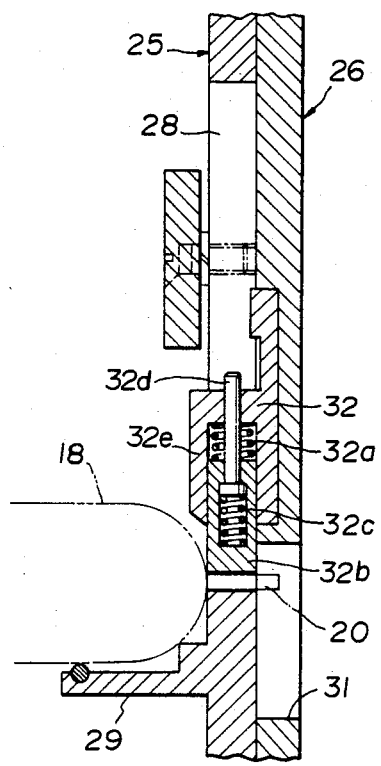
FIG. 7 is a sectional view of the unit shown as taken along the line VII—VII in FIG. 5.

In the preferred embodiment also shown in FIG. 7, the rear plate 26 is disposed to make slidable contact with the front plate 25 at the back surface thereof and is constructed to have a number of spill holes 31 perforated and arranged correspondingly at the lower portions of the respective holes 28 of the front plate 25 in such a manner that each of the gates 20 of the pieces 18 may not collide at the top thereof with the rear plate 26 when it enters each of the holes 28 so that each of the gates 20 may completely enter the hole 28 of the front plate 25.

A holder 32 is provided at the upper portion of each of the spill holes 31 to be slidable in the hole 28 of the front plate 25. The holder 32 makes at the front and rear surfaces thereof surface contacts with the inside surfaces of the front and rear plates 25 and 26, respectively, in slidable manner to be assembled tightly with the front and rear plates 25 and 26.

As also shown in FIG. 7, the holder 32 has a compression spring 32a filled therein, a gate holding piece 32b telescopically slidably inserted thereinto, a balance spring 32c filled in the gate holding piece 32b, a guide pin 32d slidably inserted through the holder 32 and partly at the gate holding piece 32b, and a guide cylinder 32e for guiding the gate holding piece 32b slidably.

Referring back to FIGS. 5 and 6, a hydraulic cylinder 27 is elevationally telescopically secured to the rear plate 26 via a bracket 33 fixedly secured to the back surface at the upper portion of the rear plate 26 in a manner slidable at a piston rod 34.

In FIG. 6, with reference to the detailed relationship between the rear plate 26 and the cylinder 27, a vertical pin 41 is secured to the side of the cylinder 27 and is journaled with the bracket 33 is slidable manner in such a manner that the cylinder 27 is relatively elevationally movable with respect to the rear plate 26.

Figure 8:
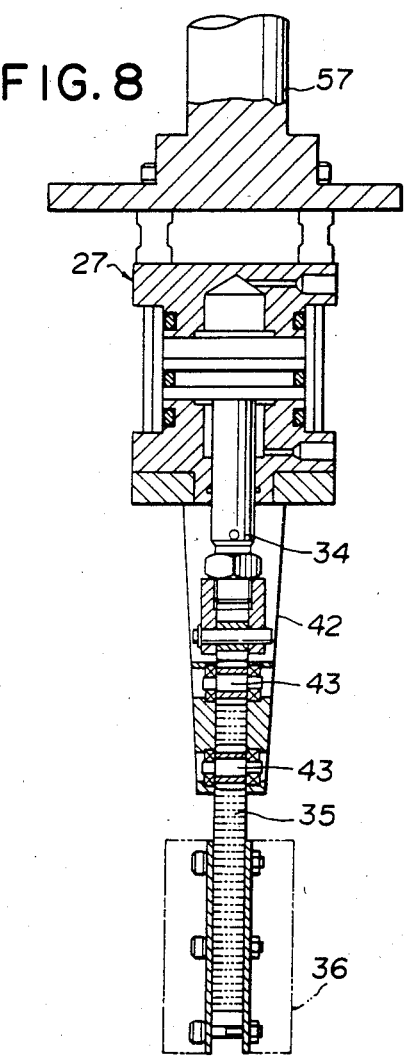
FIG. 8 is a sectional view of the base plate taken along the line VIII—VIII in FIG. 6.

Further referring to FIG. 8, a frame 42 is suspended from the bottom of the cylinder 27 and is constructed to mount a pinion 43 at the lower portion therein. A rack 35 staying in mesh with the pinion 43 is connected to the lower end of the piston rod 34 telescoped with the cylinder 27, and is also secured at the lower end thereof through a bracket 36 to the back surface at the lower portion of the rear plate 26. Thus, as the rear plate 26, bracket 33, piston rod 34, rack 35, and bracket 36 are integrally assembled via the pins or the like, the rear plate 26 can be elevationally moved with respect to the cylinder 27 upon telescopic movements of the cylinder 27 at the piston rod 34.

With reference back to FIG. 6, a rack 53 is disposed to face the rack 35 connected to the piston rod 34, and is assembled to stay in mesh with the pinion 43 slidably in the frame 42, and is further integrally fixed through a connecting pin 54 movably inserted into a longitudinally elongated hole 37 perforated at the lower portion of the rear plate 26, to the front plate 25.

The base plate 24 is thus coupled with the moving means 23 as was heretofore described. As obviously understood also from FIG. 8, the piston rod 34 is suspended from the cylinder 27 in the state as shown in FIGS. 8, 5, and 6. Accordingly, when the piston rod 34 is hydraulically retracted from the cylinder 27 upwardly, the pinion 43 staying in mesh with the rack 35 connected thereto turns as designated by an arrow in FIG. 6 to thus cause the rack 53 integral with the front plate 25 to move downwardly as indicated by an arrow in FIG. 6. The front and rear plates 25 and 26 relatively slidably move by means of such operations of the piston rod 34 telescoped with the cylinder 27. Therefore, the hole 37 of the rear plate 26 for movably receiving the pin 54 for connecting the rack 53 to the front plate 25 must have the length of the extent that the pin 54 may not be obstructed by the relative elevational movements of the front and rear plates 25 and 26.

In another respect of the relative elevational movements of the front and rear plates 25 and 26, since the cylinder 27 is fixedly secured to an overhead moving mechanism 60 as will be hereinafter described in more detail, the rear plate 26 moves upwardly with respect to the cylinder 27 and the front plate 25 upon retraction of the piston rod 34 with the cylinder 27. In other words, the front plate 25 and the cylinder 27 themselves do not move at all.

As a result of this relative movement of the front and rear plates 25 and 26 of the base plate 24, when the gate 20 of the piece 18 is inserted into the gap between the lower end surface of the hole 28 of the front plate 25 and the bottom surface of the gate holding piece 32b of the holder 32 while the gap is sufficiently opened, namely the piston rod 34 is upwardly retracted with the cylinder 27 and the piston rod 34 is then extended downwardly from the cylinder 27, the rear plate 26 is relatively elevationally upwardly and then downwardly moved with respect to the front plate 25 to thus cause the gate 20 of the piece 18 to be held between the lower end surface of the hole 28 of the front plate 25 and the bottom surface of the gate holding piece 32b of the holder 32.

Figure 4:
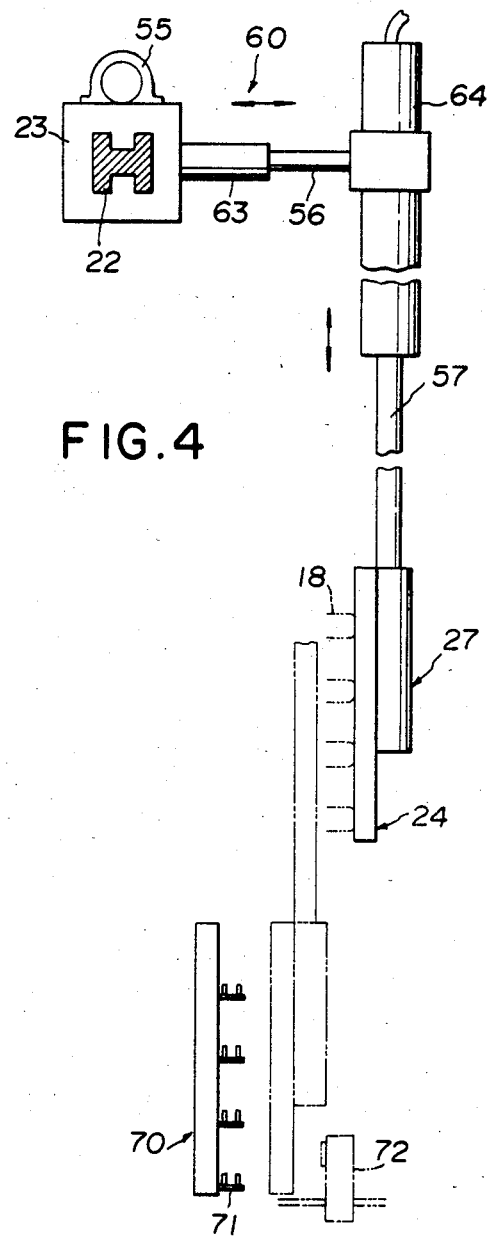
FIG. 4 is a side view of the device shown in FIG. 3.

The base plate 24 thus constructed and operated as was heretofore described performs sufficiently its function as mounted to the moving mechanism 60 as briefly shown in FIGS. 3 and 4.

The rail 22 is moved over the injection molding machine 10 with the opened molds to a preferable position, i.e., a gate separator 70, in the next step. The moving means 23 moves along the rail 22 via a motor 55 mounted on the moving means 23. A longitudinal cylinder 63 is horizontally perpendicularly mounted to the moving means 23 with respect to the rail 22. An elevational cylinder 64 is additionally attached vertically to the front end of the piston rod 56 telescoped with the cylinder 63. The cylinder 27 is connected at the upper end thereof to the lower end of the piston rod 57 telescoped with the cylinder 64, as clearly disclosed in FIG. 3.

Therefore, the base plate 24 can laterally move along the rail 22 via the moving means 23, longitudinally move via the longitudinal cylinder 63, and elevationally move via the elevational cylinder 64 in FIGS. 3 and 4.

In operation of the device with the piece removing unit thus constructed according to the present invention, the base plate 24 is, for example, moved upwardly by the telescopic operation of the cylinder 64, is approached to the moving means 23 by the operation of the cylinder 63, and is then disposed over the molds of the injection molding machine 10 by the moving means 23.

In the meantime, the pieces 18 formed immediately after the molding are adhered to the corresponding cores 52 projected from the male mold 51 opened in the injection molding machine 10. The cylinders 63 and 64 are telescoped to face the front plate 25 at predetermined position with the surface of the mold 51. The cylinder 63 is further operated to approach the base plate 24 to the mold 51 in order that the gates 20 of the respective pieces 18 may enter corresponding holes 28 of the front plate 25 as was previously described.

Then, the gates 20 of the respective pieces 18 are held respectively between the holders 32 and the front plate 25 by the telescopic operation of the cylinder 27. Then, the cylinder 63 is telescoped to horizontally draw the pieces 18 from the respective cores 52 of the mold 51. However, as a matter of course, since the pieces 18 are tightly adhered to the respective cores 52 of the mold 51, it is apprehended that, if they are held between the holders 32 and the front plate 25 by elevationally moving the front plate 25, they may deform. Accordingly, only the rear plate 26 is constructed to elevationally move with respect to the front plate 25 relatively so that the holes 28 of the front plate 25 disposed accurately with the respective pieces 18 as coupled with the respective cores 52 of the mold 51 may not displace.

After the pieces 18 are thus drawn from the mold by the base plate 24, the latter is raised by the cylinder 64, and is moved over the gate separator 70 as exemplified to be faced with piece holders 71 of the piece separator 70 by the telescopic operations of the cylinders 63 and 64. Then, the gates 20 of the respective pieces 18 will be placed on the respective piece holders 71 and be cut as will be hereinafter described in more detail.

Since the piece removing unit is thus constructed and operated, it can remove a number of the pieces 18 to be molded into bottle-shaped containers of polyethylene terephthalate resin immediately after the molding and convey them to the next process step without breakage of the array from the injection molding. Since the piece removing unit further draws the pieces from the respective cores of the mold while holding the gates of the respective pieces and conveys them as they are, it may not scratch any of the pieces 18 which are feasibly subjected to scratches as formed immediately after the molding.

Gate Cutting Unit

The gate cutting unit 12 constructed according to the present invention is constituted to receive the pieces 18 integral with the respective gates 20 from the injection molding machine 10 horizontally in the same array as that at the injection molding time, intermittently convey a number of the pieces to the next process step until the next pieces 18 are injection-molded by the injection molding machine 10, and cut the gates 20 of the respective pieces 20 during the stoppage of the intermittent conveyance of the pieces 20.

The gate cutting unit 12 has a piece conveyor 72 for intermittently moving the respective piece holders 71 for horizontally receiving a number of the pieces 18 of the same array as that at the injection molding time, at predetermined distance and speed, and a gate cutter 74 for cutting the gates 20 of the respective pieces 18 conveyed to the cutting position by the piece conveyor 72 during the stopping period of the piece holders 71.

The components of the piece cutting unit 12 will be described further in detail.

Piece Conveyor 72

FIGS. 9, 10, 11 and 13 show a preferred embodiment of the piece conveyor 72 of the piece cutting unit according to the present invention, which is operated to draw a number of the pieces from the injection molding machine, and, more particularly, to draw horizontally the pieces 18 (16 pieces as exemplified in the Figures) in the same array as that at the injection molding time and sequentially convey the pieces 18 (4 pieces as exemplified in this embodiment) to the cutting position intermittently until the next pieces are completely molded in the injection molding machine.

In the preferred embodiment of the piece conveyor 72 as shown, the piece conveyor 72 assembles the piece holders 71 for horizontally holding the pieces 18 at predetermined interval with each of chains 91 installed vertically respectively between drive sprockets 88 and guide sprocket 90 mounted on a base 73, and arranges a required number of a set of the drive and guide sprockets 88 and 90, chain 91 and piece holders 71 in parallel.

The piece holders 71 are arranged entirely in the same array as that of the cores 52 of the mold 51 in the injection molding machine 10 at the chain 91 in order to draw the injection-molded pieces 18 and to convey them in the same array onto the piece holders 71 as that at the injection molding time.

Each of the chains 91 (4 chains as exemplified in the embodiment) of predetermined number for assembling the piece holders 71 at predetermined intervals is vertically engaged between the drive sprocket 88 installed on the base 73 and the guide sprocket 90 installed at a mounting frame 89 stood on the base 73 directly above the sprocket 88.

Figure 9:
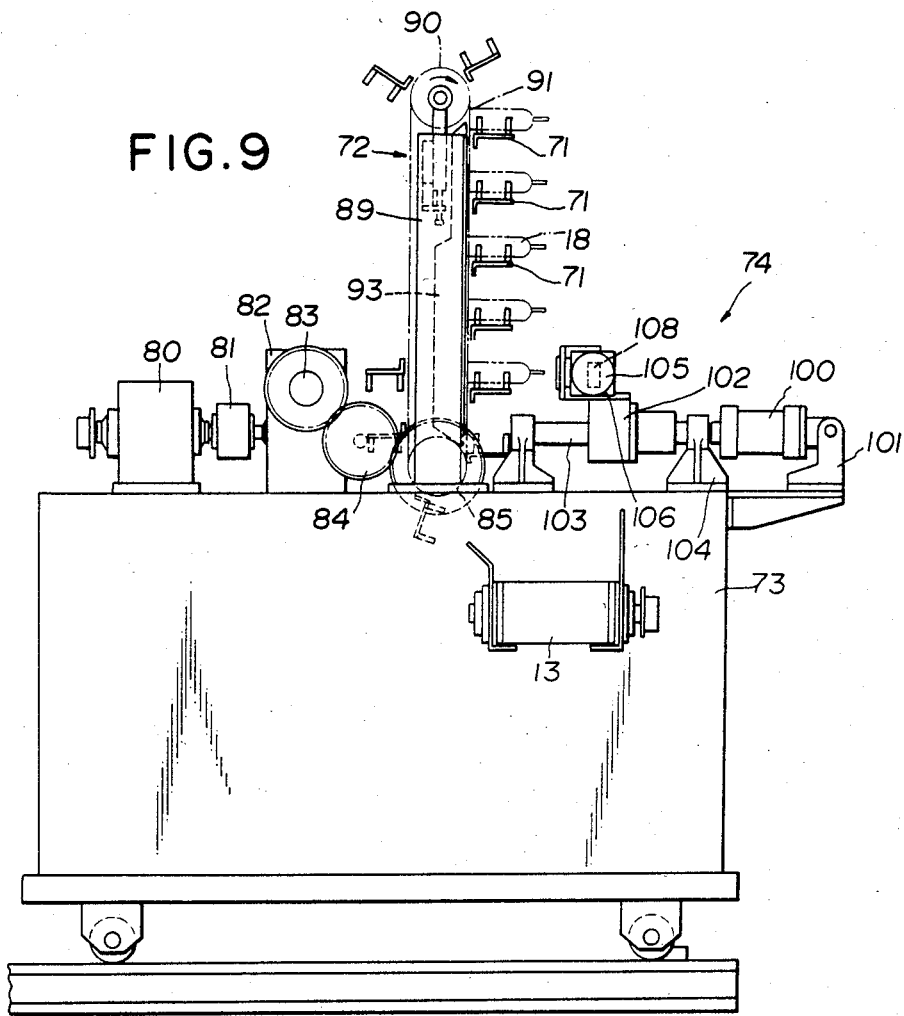
FIG. 9 is a side view of the gate cutting unit of a preferred embodiment of the present invention used for cutting the gate of the injection molded piece.

Each of the drive sprockets 88 is fixedly secured to a drive shaft 86 rotatably secured via a bearing 87 onto the base 73, and is driven through a reduction gear 80, torque limiter 81, index unit 82, output gear 83, and transmission gear 84 via a drive gear 85 secured to one end of the drive shaft 86 from a prime mover, as specifically illustrated in FIG. 9.

Although the rotating force of the prime mover is continuous constant speed in this case, it is converted to an intermittent rotating operation of predetermined duration through the index unit 82 and is thus transmitted to the drive shaft 86.

The rotating amount of the drive shaft 86 as intermittently transmitted in each intermittent rotation is so set that the chain 91 engaged between the sprockets 88 and 90 moves in the distance equal to that of the piece holder 71 mounted at the chain 91.

Accordingly, each of the piece holders 71 will stop always at a predetermined position where the previous piece holer 71 was stopped by the intermittent movement, that is, the respective piece holders 71 will sequentially stop at predetermined stopping positions in order. In other words, all the piece holders 71 may always stop entirely at the same array and interval as those of the pieces 18 drawn from the mold 51 in the injection molding machine 10.

A stopper plate 93 is fixedly disposed for setting the backward moving limit of the held pieces, at the back of the piece holders 71 disposed at the side for receiving the pieces 18, at the front side of the piece holders 71 mounted at the chains 91 vertically engaged over between the sprockets 88 and 90, and particularly at the back of the piece holders 71 disposed at the cutting position.

The stopper plate 93 is constructed and installed to prevent the pieces 18 supplied onto the piece holders 71 from backwardly displacing to drop by the vibration caused by the movement of the piece holders 71 and to restrict the pieces 18 at the cutting position. More particularly, when the pieces 18 are inserted into piece head inserting recesses 113 of the gate cutting unit 12 at the cutting position as will be hereinafter described in more detail, they may not largely move backwardly on the piece holders 71 by the inserting force.

Gate Cutter 74

In the preferred embodiment shown in FIGS. 9 through 15, when the lowermost piece holder 71 of the holders 71 receiving the pieces 18 drawn in the same attitude and array as those at the molding time from the injection molding machine 10 via the piece removing unit 11 reaches its cutting position as downwardly moved by one intermittent movement after the reception of the pieces 18, the gate cutter 74 is operated to cut the gates 20 of the pieces 18 held by the piece holders 71 stopped at the cutting position during the stopped period of the piece holders 71 to separate the gate 20 from the piece 18.

A slide base 102 is slidably assembled along a guide rail 103 secured via a bracket 104 to the base 73 horizontally along the axes of the pieces 18 held by the respective piece holders 71 at the front (rightwardly in FIG. 9) of the mounted piece holders 71 over the base 73. That is, the slide base 102, is mounted longitudinally movably back and forth toward the pieces 18 held by the piece holders 71.

The piston rod telescoped with a cylinder 100 fixedly secured to a bracket 101 fixed onto the upper front end (the rightmost end in FIG. 9) of the base 73 is connected to the slide base 102 to slidably move the slide base 102 along the guide rail 103 by the telescopic movements of the piston rod telescoped with the cylinder 100.

A piece head holder 111 is secured via mounting plates 114 and 115 onto the upper surface of the slide base 102 to face the piece 18 disposed at its cutting position at the front. In the preferred embodiment particularly shown in FIG. 15, the piece head holder 111 has a center hole opened to allow only the gate 20 of the piece 18 at the bottom of short cylindrical shape column to protrude therethrough and to make tight contact with the head (bottom) of the piece 18.

A cushion member 112 is fixedly inserted into the piece head holder 111 to hold the piece 18 to be inserted into the piece head holder 111 without any scratch or fluctuation. Thus, a piece head inserting recess 113 is formed by the cushion member 112 and piece head holder fixture within the piece head holder 111.

Figure 10:
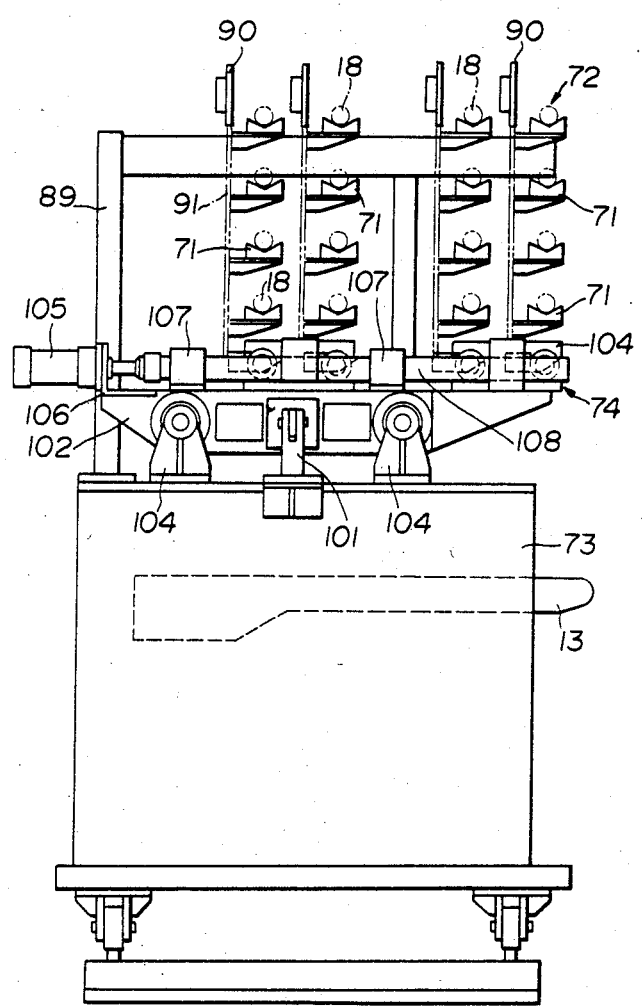
FIG. 10 is a front view of the gate cutting unit shown in FIG. 9.
Figure 11:
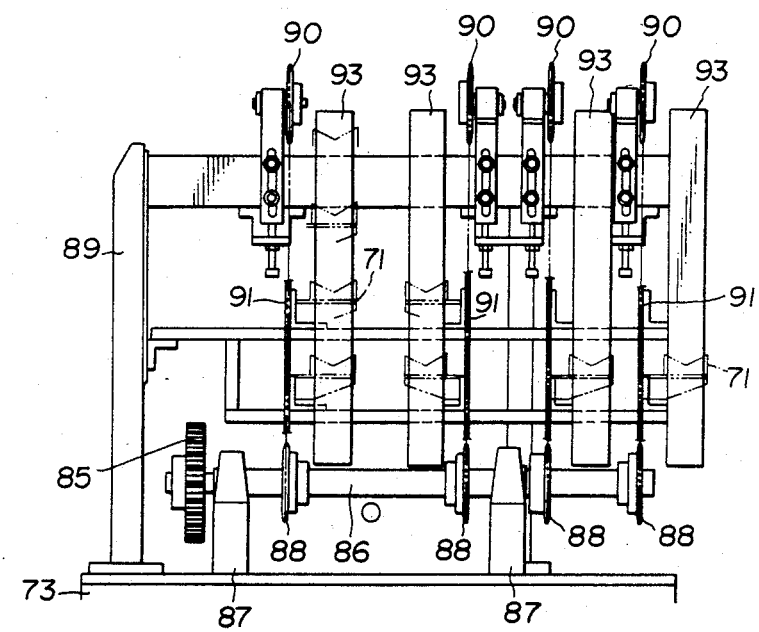
FIG. 11 is a front view of a preferred embodiment of the injection molded piece intermittently lowering mechanism of the present invention used for the gate cutting unit.

As more specifically exemplified in FIG. 10, a cutter cylinder 105 is secured fixedly to one side end (the leftmost end as shown) of the upper surface of the slide base 102 by a mounting fixture 106 separately from the piece head holder 111. A rectilinear square-cross sectional bar-like slide bar 108 is connected at the end thereof to the end of the piston rod telescoped with the cylinder 105. This slide bar 108 is so assembled by a guide bracket 107 fixedly secured onto the upper surface of the slide base 102 as to be movable in the horizontal direction perpendicular to the axis of the pieces 18 held by the piece holders 71, i.e., along the axes of the slide bar 108.

A cutter 110 is secured via a mounting fixture 109 to the slide bar 108 at the position facing the piece head holder 111 in a manner making close contact with the front surface of the piece head holder fixture at the cutting edge thereof. The cutter 110 makes at one surface thereof including the cutting edge contact with the front surface of the piece head holder 111 to slidably move the front surface of the piece head holder 111 by the movement of the slide bar 108 upon telescopic operation of the cutter cylinder 105.

In operation of the gate cutter 74 thus constructed according to the present invention, when the pieces 18 are drawn from the injection molding machine 10, are conveyed to the piece holder 71 in the attitude that the gates 20 integral therewith are directed forwardly by the piece removing unit 11, and then the piece removing unit 11 is retracted from the pieces 18, the respective piece holder 71 are intermittently moved to cause the lowermost holders 71 for holding the piece 18 to be stopped at the cutting position. When the piece holder 71 is thus stopped at the cutting position, the cylinder 100 is telescoped to move forward the slide base 102 along the guide rail 103 to urge the head of the piece 18 disposed at the cutting position tightly within the piece head inserting recess 113. Since the piece 18 thus held on the piece holder 71 makes contact at the rear end thereof with the stopper plate 93 as was previously described, it is tightly inserted at the head thereof into the piece head inserting recess 113 by the forward movement of the slide base 102.

Figure 12:
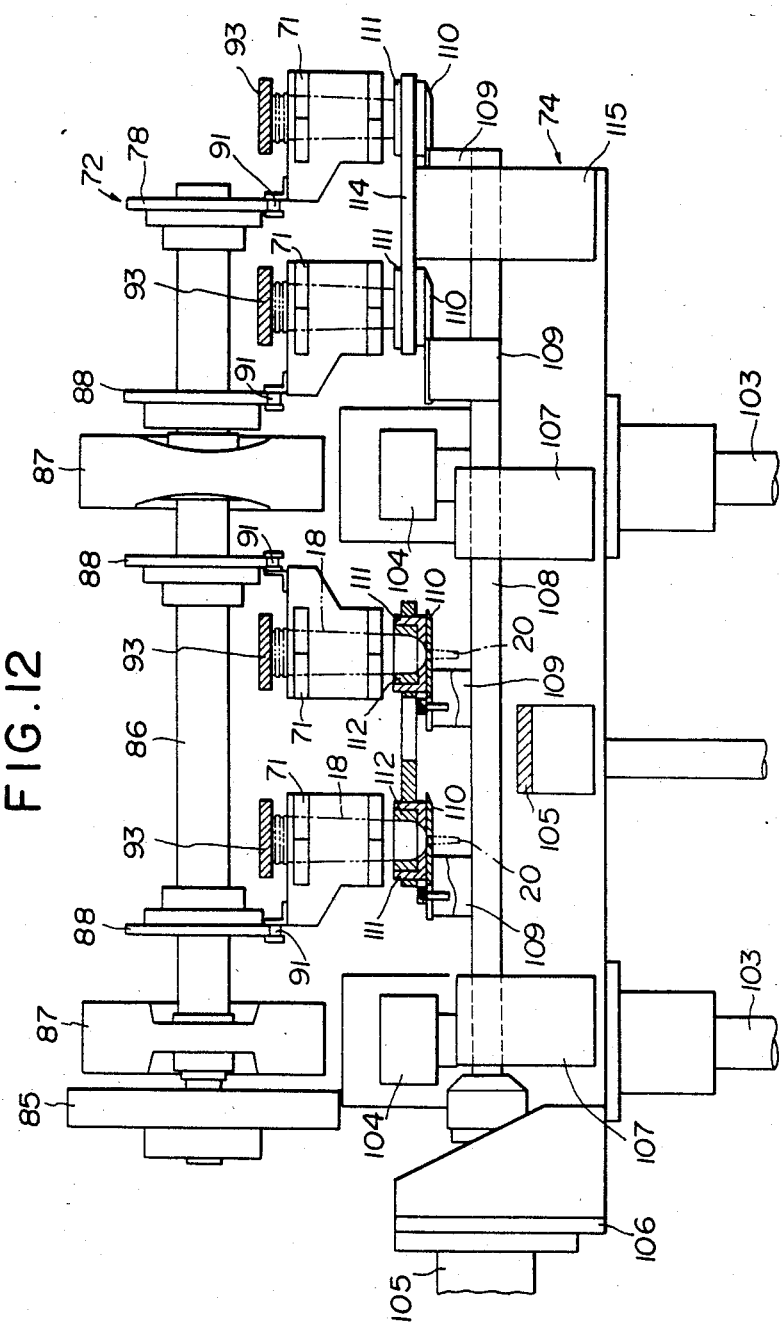
FIG. 12 is an enlarged plan view of the cutting portion in the gate cutting unit.
Figure 13:
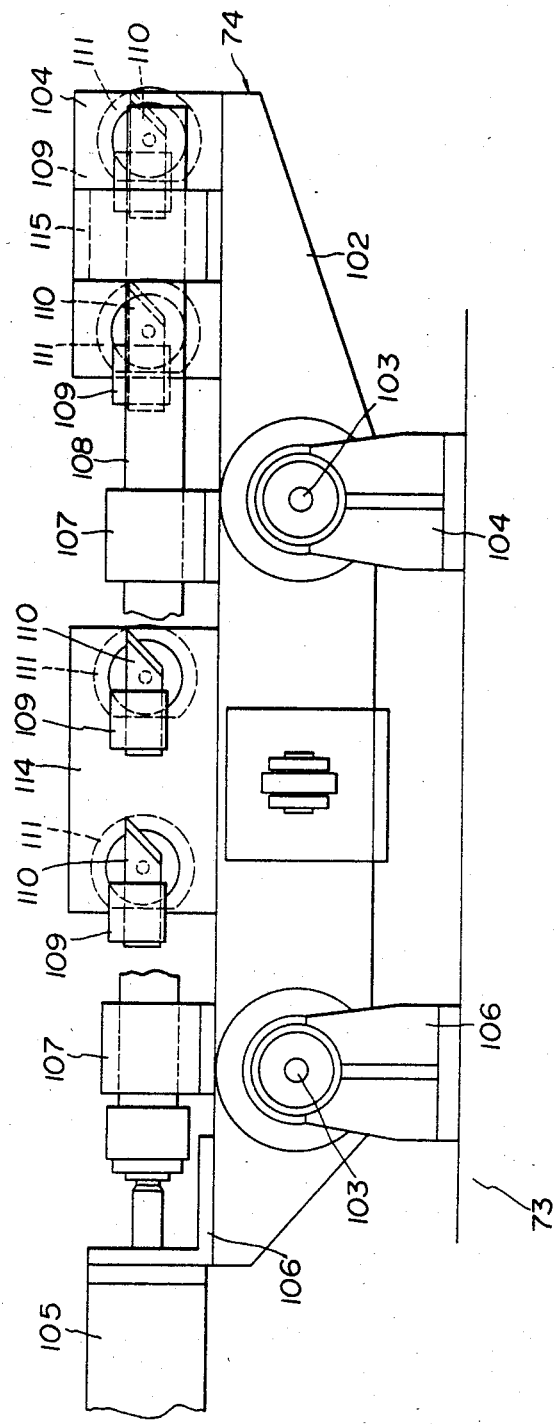
FIG. 13 is an enlarged front view of the cutting portion shown in FIG. 12.
Figure 14:
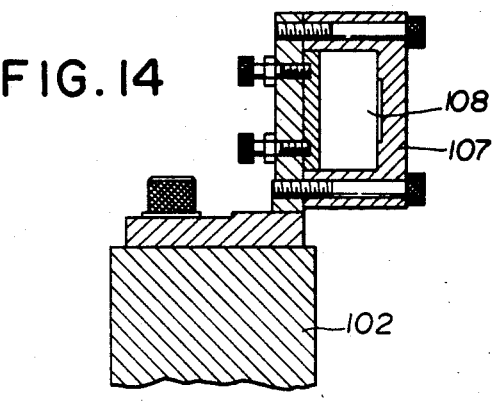
FIG. 14 is a sectional view of the cutting portion taken along the line XIV—XIV in FIG. 13.
Figure 15:
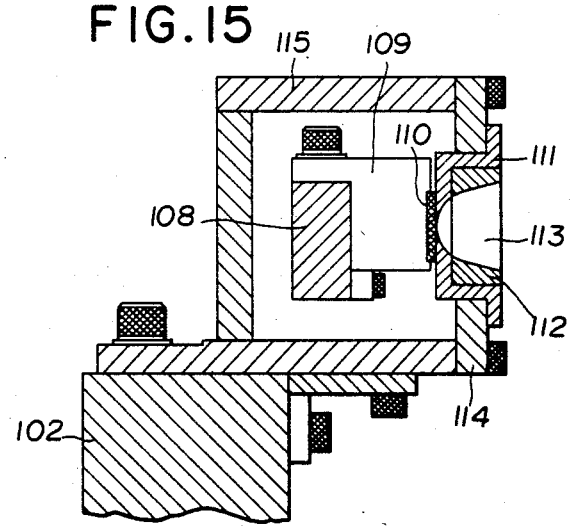
FIG. 15 is a sectional view of the cutting portion taken along the line XV—XV in FIG. 13.

When the slide base 102 is moved forwardly so that the piece 18 is inserted at the head thereof tightly into the piece head inserting recess 113, the cutter cylinder 105 is telescoped to move forwardly the slide bar 108 as in rightward direction to FIGS. 12 and 13 to thus cause the cutter 110 moving integrally with the slide bar 108 to separate the gate 20 projected from the front surface of the piece head holder 111 from the piece 18.

When the cutter 110 completely cuts to separate the gate 20 from the piece 18, the slide bar 106 is backwardly returned integrally with the cutter 110 in a manner of reverse operation of the cutter cylinder 105 to the above. Then the cylinder 100 is reversely telescoped to move the slide base 102 back to the original position.

It is noted that the respective movements of the slide base 102 from the forward movement to the backward movement must be executed during the stopping period of the piece holders 71 in intermittent operation.

The pieces 18 supplied by one operation of the piece removing unit 11 are sequentially cut at the gates 20 thereof as described above. It is also noted that all such pieces 18 must be completely separated from the gates 20 thereof until the pieces 18 formed in the next injection molding process are then supplied thereof.

In the meantime, the piece holders 71 must be stopped when they receive the pieces 18 from the piece removing unit 11. Since the time from when the pieces 18 are inserted into the respective piece holders 71 by the piece removing unit 11 to when the piece removing unit 11 is backwardly returned is longer than the stopping time of the intermittent operation required to sequentially cut the gates 20 from the pieces 18 of predetermined number as supplied, it must stop the intermittent operation of the piece holders 71 for predetermined time when the pieces 18 are conveyed from the piece removing unit 11 to the piece holders 71.

There may variously be considered means for stopping the intermittent operation of the piece holders 71 for this predetermined time. The most simple means, for example, has preferably an electromagnetic clutch installed at the torque limiter 81 in the piece conveyor 72, and a limit switch for controlling the clutch to detect the operation of the piece removing unit 11.

The pieces 18 thus separated from their gates 20 are lowered while being held by the piece holders 71 by the intermittent movement of the piece holders 71, and are then dropped on the belt conveyor 13 from the piece holders 71 when the piece holders 71 are tilted and reversely turned at the drive sprocket 88 to be then conveyed to the next cooler via the conveyor 13.

Cooler

FIGS. 16 and 17 show a preferred embodiment of the cooler 14 according to the present invention. The pieces 18 separated from their gates 20 by the gate cutting unit 12 are conveyed to the cooler 14 via the belt conveyor 13 as described previously.

Reference numeral 120 illustrates a conveyor obliquely installed toward the forward direction via a flat plate 142 at the end of the conveyor 13. This conveyor 120 is constructed to have an endless belt 122 engaged between pulleys 121 and 121 provided at both ends, which belt 122, as exemplified in FIGS. 16 and 17, has lateral projection straps 123 formed at equal intervals on the outer surface thereof to convey the pieces 18 from the lower position to the higher position engaged with the straps 123 by the circulation of the belt 122.

124 represents a supporting plate for preventing the belt 122 from deflecting.

130 illustrates a cover for enclosing the belt conveyor 120, which cover 130 has a cooling air inlet 132 formed at the center of the top plate 131 thereof.

The cooling air is fed into the cover 130 to cool the hot pieces 18 formed immediately after the injection molding process to a predetermined lower temperature thereby to prepare the pieces 18 under the optimum conditions for the biaxial orientation blow molding of the next step at a uniform heating time. It is, therefore, noted that, since the pieces 18 cannot be abruptly cooled when they are cooled to room temperature or lower predetermined temperature in the step of conveying the pieces 18 via the conveyor 120, the cooling air must be scattered within the cover 130 so as to gradually cool the conveyed pieces 18.

Therefore, a number of vent holes 133 are perforated at a scattering plate 134, which is installed a suitable distance from the top plate 131 of the cover 130 within the cover 130 to widely distribute the cooling air from the inlet 132 via the vent holes 133.

Since it is apprehended that the cooling air will not be sufficiently scattered if the holes 133 are perforated directly under the inlet 132 at the scattering plate 134, the holes 132 are so perforated as to avoid the portion directly under the inlet 132 of the scattering plate 134 to distribute the air more completely.

Reference numeral 143 depicts a conveyor for feeding the pieces 18 conveyed to the higher position further to the next step.

According to the present invention, as fully described hereinbefore, since the device for removing and conveying the can draw the pieces injection-molded pieces in the injection molding machine and convey them to the gate cutting unit without scratch to automatically cut the gates from the pieces, it can shorten the time required to cut the gates from the pieces, eliminate the manual power entirely, largely reduce the molding time to complete the bottleshaped containers of biaxial orientation blow-molded polyethylene terephthalate resin, enable automation of the respective molding works to complete the bottle-shaped containers, and perform without troubles with relatively simple construction and operation. Furthermore, since the device of the present invention can exactly convey the pieces formed immediately after the injection molding process without any scratch and can cool the pieces thus conveyed to the optimum predetermined temperature for the heating step immediately before the biaxial orientation blow molding process, it can prepare the pieces to be under the optimum conditions for the next molding process step.

Although specific embodiments of the present invention have been described hereinbefore, it should be undersood that numerous variations thereof may be employed without departing from the invention, and it is reiterated that the examples given as above are simply illustrative of the device for removing and conveying the pieces.

What is claimed is:

1. A device for cooling and conveying hot preforms for bottle-shaped containers of polyethylene terephthalate resin immediately after formation by injection molding, said device comprising:

an endless belt conveyor for continuously conveying preforms resting on an outer surface thereof;

a cover substantially enclosing said endless belt conveyor;

a cooling air inlet provided in said cover for introducing cooling air to cool the hot preforms on said conveyor to a predetermined temperature; and a scattering plate between said inlet and said conveyor perforated with a number of vent holes for distributing the cooling air to a predetermined space between sid cover and said conveyor, wherein said vent holes are distributed on said scattering plate such that substantially none are disposed adjacent said cooling air inlet.

2. A device according to claim 1, wherein said conveyor and said cover are upwardly inclined from a rear portion to a forward portion.

3. A device according to claim 1, said device being adapted to prevent abrupt cooling of said preforms and to ensure cooling to a uniform predetermined temperature from which said preforms may be heated for biaxial orientation.

4. A device according to claim 1, wherein said endless belt conveyor further comprises lateral projection straps formed on an outer surface thereof at substantially equal intervals to aid in conveying said preforms.

* * * * *